(12) United States Patent
Moore et al.

(10) Patent No.: US 7,437,528 B1
(45) Date of Patent: Oct. 14, 2008

(54) GANG BLOCKS

(75) Inventors: William H. Moore, Fremont, CA (US); Jeffrey S. Bonwick, Los Altos, CA (US); Matthew A. Ahrens, San Francisco, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 283 days.

(21) Appl. No.: 10/919,878

(22) Filed: Aug. 17, 2004

(51) Int. Cl.
*G06F 12/00* (2006.01)
*G06F 13/00* (2006.01)
*G06F 13/28* (2006.01)

(52) U.S. Cl. ...................................................... 711/170
(58) Field of Classification Search .................. 711/170
See application file for complete search history.

(56) References Cited

U.S. PATENT DOCUMENTS

| | | | |
|---|---|---|---|
| 4,144,522 A | 3/1979 | Kageyama et al. | |
| 5,129,085 A | 7/1992 | Yamasaki | |
| 5,155,847 A | 10/1992 | Kirouac et al. | |
| 5,371,885 A * | 12/1994 | Letwin | 707/205 |
| 5,403,639 A | 4/1995 | Belsan et al. | |
| 5,410,667 A | 4/1995 | Belsan et al. | |
| 5,675,802 A | 10/1997 | Allen et al. | |
| 5,819,292 A | 10/1998 | Hitz et al. | |
| 6,209,111 B1 | 3/2001 | Kadyk et al. | |
| 6,341,341 B1 | 1/2002 | Grummon et al. | |
| 6,745,284 B1 | 6/2004 | Lee et al. | |
| 6,745,305 B2 | 6/2004 | McDowell | |
| 6,795,966 B1 | 9/2004 | Lim et al. | |
| 6,829,617 B2 | 12/2004 | Sawdon et al. | |
| 6,857,001 B2 | 2/2005 | Hitz et al. | |
| 6,892,211 B2 | 5/2005 | Hitz et al. | |
| 7,007,196 B2 | 2/2006 | Lee et al. | |
| 7,032,154 B2 | 4/2006 | Kidorf et al. | |
| 7,043,677 B1 | 5/2006 | Li | |
| 7,133,964 B2 | 11/2006 | Rodrigues et al. | |
| 7,162,486 B2 | 1/2007 | Patel et al. | |
| 7,174,352 B2 | 2/2007 | Kleiman et al. | |
| 7,200,715 B2 | 4/2007 | Kleiman et al. | |
| 2002/0004883 A1 | 1/2002 | Nguyen et al. | |
| 2002/0055942 A1 | 5/2002 | Reynolds | |
| 2002/0087788 A1 | 7/2002 | Morris | |

(Continued)

OTHER PUBLICATIONS

"The Magic Garden Explained", Prentice Hall, Berny Goodheart and James Cox, pp. 24-25, 29-30, and 390-391, 1994.*

(Continued)

*Primary Examiner*—Matt Kim
*Assistant Examiner*—Edward J Dudek
(74) *Attorney, Agent, or Firm*—Osha • Liang LLP (57) ABSTRACT

A method for allocating space on a disk involving receiving a request to allocate space on the disk having a first size, determining whether contiguous space of the first size exists on the disk. If contiguous space of the first size exists on the disk, allocating the contiguous space on the disk to obtain a contiguous space address, and responding to the request to allocate space on disk with a contiguous space pointer. If no contiguous space of the first size exists on the disk, allocating a gang block header, populating the gang block header, and responding to the request to allocate space on the disk with a gang block header pointer.

13 Claims, 8 Drawing Sheets

U.S. PATENT DOCUMENTS

| | | | |
|---|---|---|---|
| 2002/0161972 | A1* | 10/2002 | Talagala et al. ............ 711/114 |
| 2003/0033477 | A1 | 2/2003 | Johnson et al. |
| 2003/0126107 | A1 | 7/2003 | Yamagami |
| 2003/0145167 | A1 | 7/2003 | Tomita |
| 2004/0098720 | A1 | 5/2004 | Hooper |
| 2004/0107314 | A1 | 6/2004 | Kim et al. |
| 2004/0123063 | A1 | 6/2004 | Dalal et al. |
| 2004/0225834 | A1 | 11/2004 | Lu et al. |
| 2004/0234000 | A1 | 11/2004 | Page |
| 2005/0010620 | A1 | 1/2005 | Silvers et al. |
| 2005/0097270 | A1 | 5/2005 | Kleiman et al. |
| 2005/0235154 | A1 | 10/2005 | Serret-Avila |
| 2006/0168409 | A1 | 7/2006 | Kahn et al. |
| 2006/0218644 | A1 | 9/2006 | Niles et al. |
| 2006/0256965 | A1 | 11/2006 | Rowe |

OTHER PUBLICATIONS

"A Dynamic Disc Allocation Algorithm designed to reduce fragmentation during file reloading", B. J. Austin, pp. 378-381, 1970.*

"Computer Architecture and Organization", Prentice Hall, William Stallings, pp. 377-378, 2000.*

Sandberg, R. et al.; "Design and Implementation of the Sun Network Filesystem"; Sun Microsystems, Inc., 1985 USENIX Conference (12 pages).

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"Veritas File System 3.4 Administrator's Guide", VERITAS Software Corporation, Nov. 2000, http://www.veritas.com; pp. 1-227 (227 pages).

Czezatke C. et al.; "Linlogfs: A Log-Structured Filesystem for Linux"; The USENIX Association, Proceedings of FREENIX TRack: 2000 Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murray Hill, New Jersey; Software-Practice Experience, vol. 21(12), pp. 1289-1299, Dec. 1991 (11 pages).

Sun StorEdge Instant Image 2.0 System Administrator's Guide; Sun Microsystems, Inc., Feb. 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The LOCUS Distributed System Architecture"; The MIT Press, Cambridge, Massachussetts, 1985 The Massachussetts Institute of Technology (8 pages).

Gray, J. et al.; "The Recovery Manager of the System R Database Manager"; Computing Syrveys, vol. 13, No. 2, Jun. 1981 (20 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am 23.05. 1991 an der TU Berlin, and English Translation (245 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistant Snapshots"; Department of Computer Science and Automation, Indian Institute of Science, Bangalore - 560 012, Jan. 2000 (38 pages).

"Proceedings of the 5th Annual Linux Showcase & Conference" USENIX Association, Oakland, California, Nov. 5-10, 2001 (11 pages).

Borg, A. et al.; "Fault Tolerance Under"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, University of California, 1991 (15 pages).

Hecht, M.S. et al.; "Shadowed Management of Free Disk Pages with a Limked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 UDENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Johnson, J. E. et al.; "Overview of the Spiralog File System", Digital Technical Journal, vol. 8, No. 2, 1996, pp. 5-14 (10 pages).

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M.L.; "File System Performance and Transaction Support"; University of California at Berkeley, 1992 (131 pages).

* cited by examiner

GANG BLOCKS

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

To access a file, the operating system (via the file system) typically provides file manipulation interfaces to open, close, read, and write the data within each file. An application, which may reside on the local system (i.e., computer) or may be located on a remote system, uses files as an abstraction to address data. Conventionally, this data is stored on a storage device, such as a disk. The file system stores data on the storage device by managing the allocation of space within the storage device.

Typically, the volume manager provides space, which is managed by the file system. Two common types of file system space allocation strategies are known as block-based allocation and extent-based allocation. Block-based allocation creates incremental disk space for each file each time the file is extended (i.e., modified via a write request to add information), whereas extent-based allocation creates a large series of contiguous blocks (i.e., extents) each time the file exhausts the space available in the file's last extent.

When allocating space, both block-based and extent-based allocation use space provided by the volume manager. The volume manager allows multiple physical disks to be used as a single volume (i.e., a virtual disk) to provide larger consolidated storage sizes and simpler management. The volume manager allows users to organize data along volume boundaries (i.e., each volume has physical disk space allocated to the volume such that the volume is tied only to that dedicated physical disk). The volume manager is typically implemented as a separate layer between the physical disks and the file system, and is presented to the user as a virtual disk device. In other words, volume managers organize the collections of physical devices (e.g., disks) into virtual devices. Additionally, the space allocated within the volume manager is handled by the file system. Consequently, the volume manager is not aware of which blocks within the available storage space are in use and which blocks are free for data to be stored.

Further, file systems may be mounted on the virtual disk devices. Thus, physical disks are partitioned and allocated to multiple virtual disk devices, and each virtual disk device is capable of having a file system that exclusively uses that particular virtual disk device. A request to access a file is typically performed by an application, via the file system, using a file name and logical offset. This file name and logical offset (i.e., the manner in which applications express file operation requests) corresponds to a location within the virtual disk device. Subsequently, the request is translated to physical disk space on the storage device by the volume manager, allowing the user of the application to access the data within a particular file.

Typically, file systems allocate uniform block sizes to store data. For example, data may be allocated in block sizes of 128 Kbytes, 64 Kbytes, 32 Kbytes, etc. Each block of allocated space is a contiguous area of memory within physical disk space. In other words, data is stored in blocks that are allocated based on adjacent space on physical disks rather than allocating blocks of various different sizes that are distributed across different areas of physical disk space. In some instances, storing data in this manner may not utilize smaller, non-uniform blocks of free space on physical disks.

SUMMARY

In general, in one aspect, the invention relates to a method for allocating space on a disk comprising receiving a request to allocate space on the disk having a first size, determining whether contiguous space of the first size exists on the disk, if contiguous space of the first size exists on the disk allocating the contiguous space on the disk to obtain a contiguous space address, and responding to the request to allocate space on disk with a contiguous space pointer, if no contiguous space of the first size exists on the disk allocating a gang block header, populating the gang block header, and responding to the request to allocate space on the disk with a gang block header pointer.

In general, in one aspect, the invention relates to a method for retrieving a block comprising receiving a request to read a block, wherein the request comprises a first block pointer, determining whether a gang block header bit in the first block pointer is set, if the gang block header bit is not set retrieving the block using the first block pointer, if the gang block header bit is set retrieving a gang block header using the first block pointer, processing the gang block header to obtain at least two sub-blocks, wherein the size of each sub-block is less than the size of the block, combining the at least two sub-blocks to obtain the block.

In general, in one aspect, the invention relates to a system, comprising a storage pool comprising a data block and an indirect block, wherein the indirect block comprises a data block checksum, a gang block header bit, and a data block location, and a storage pool allocator configured to store the data block and the indirect block in the storage pool.

In general, in one aspect, the invention relates to a system, comprising a storage pool comprising a file system, wherein the file system comprises a plurality of child blocks, wherein each of the plurality of child blocks comprises one selected from the group consisting of a data block, and an indirect block, wherein the indirect block references at least one of the plurality of child blocks, a root block referencing at least one of the plurality of child blocks, wherein the root block comprises a root checksum obtained using at least one of the plurality of child blocks, wherein each indirect block comprises a gang block header bit and a child block checksum obtained using at least one of the plurality of child blocks, and a storage pool allocator configured to store the root block and the plurality of child blocks in the storage pool.

In general, in one aspect, the invention relates to a computer system for allocating space on a disk comprising a processor, a memory, a storage device, and software instructions stored in the memory for enabling the computer system under control of the processor, to receive a request to allocate space on the disk having a first size determine whether contiguous space of, the first size exists on the disk, if contiguous space of the first size exists on the disk, allocate the contiguous space on the disk to obtain a contiguous space address, and respond to the request to allocate space on disk with a contiguous space pointer, if no contiguous space of the first size exists on the disk allocate a gang block header, populate the gang block header, and respond to the request to allocate space on the disk with a gang block header pointer.

In general, in one aspect, the invention relates to a computer system for retrieving a block comprising a processor, a memory, a storage device, and software instructions stored in the memory for enabling the computer system under control of the processor, to receive a request to read a block, wherein the request comprises a first block pointer, determine whether a gang block header bit in the first block pointer is set, if the gang block header bit is not set retrieve the block using the first block pointer, if the gang block header bit is set retrieve a gang block header using the first block pointer, process the gang block header to obtain at least two sub-blocks, wherein the size of each sub-block is less than the size of the block, and combine the at least two sub-blocks to obtain the block.

In general, in one aspect, the invention relates to a computer readable medium for allocating space on a disk comprising software instructions to receive a request to allocate space on the disk having a first size, determine whether contiguous space of the first size exists on the disk, if contiguous space of the first size exists on the disk allocate the contiguous space on the disk to obtain a contiguous space address, and respond to the request to allocate space on disk with a contiguous space pointer, if no contiguous space of the first size exists on the disk allocate a gang block header, populate the gang block header, and respond to the request to allocate space on the disk with a gang block header pointer.

In general, in one aspect, the invention relates to a computer readable medium for retrieving a block comprising software instructions to receive a request to read a block, wherein the request comprises a first block pointer, determine whether a gang block header bit in the first block pointer is set, if the gang block header bit is not set retrieve the block using the first block pointer, if the gang block header bit is set retrieve a gang block header using the first block pointer, process the gang block header to obtain at least two sub-blocks, wherein the size of each sub-block is less than the size of the block, and combine the at least two sub-blocks to obtain the block.

In general, in one aspect, the invention relates to a network system having a plurality of nodes, comprising a storage pool comprising a data block and an indirect block, wherein the indirect block comprises a data block checksum, a gang block header bit, and a data block location, and a storage pool allocator configured to store the data block and the indirect block in the storage pool, wherein the storage pool resides on any one of the plurality of nodes, and wherein the storage pool allocator resides on any one of the plurality of nodes.

Other aspects of the invention will be apparent from the following description and the appended claims.

DETAILED DESCRIPTION

Exemplary embodiments of the invention will be described with reference to the accompanying drawings. Like items in the drawings are shown with the same reference numbers. Further, the use of "ST" in the drawings is equivalent to the use of "Step" in the detailed description below.

In an embodiment of the invention, numerous specific details are set forth in order to provide a more thorough understanding of the invention. In other instances, well-known features have not been described in detail to avoid obscuring the invention.

In general, embodiments of the invention relate to providing a method to allocate non-uniform, noncontiguous blocks of free space to store data within a file system. More specifically, embodiments of the invention use gang blocks and gang block headers to piece together noncontiguous blocks of free space and represent these separate blocks as a single block of a uniform size.

Figure 1:
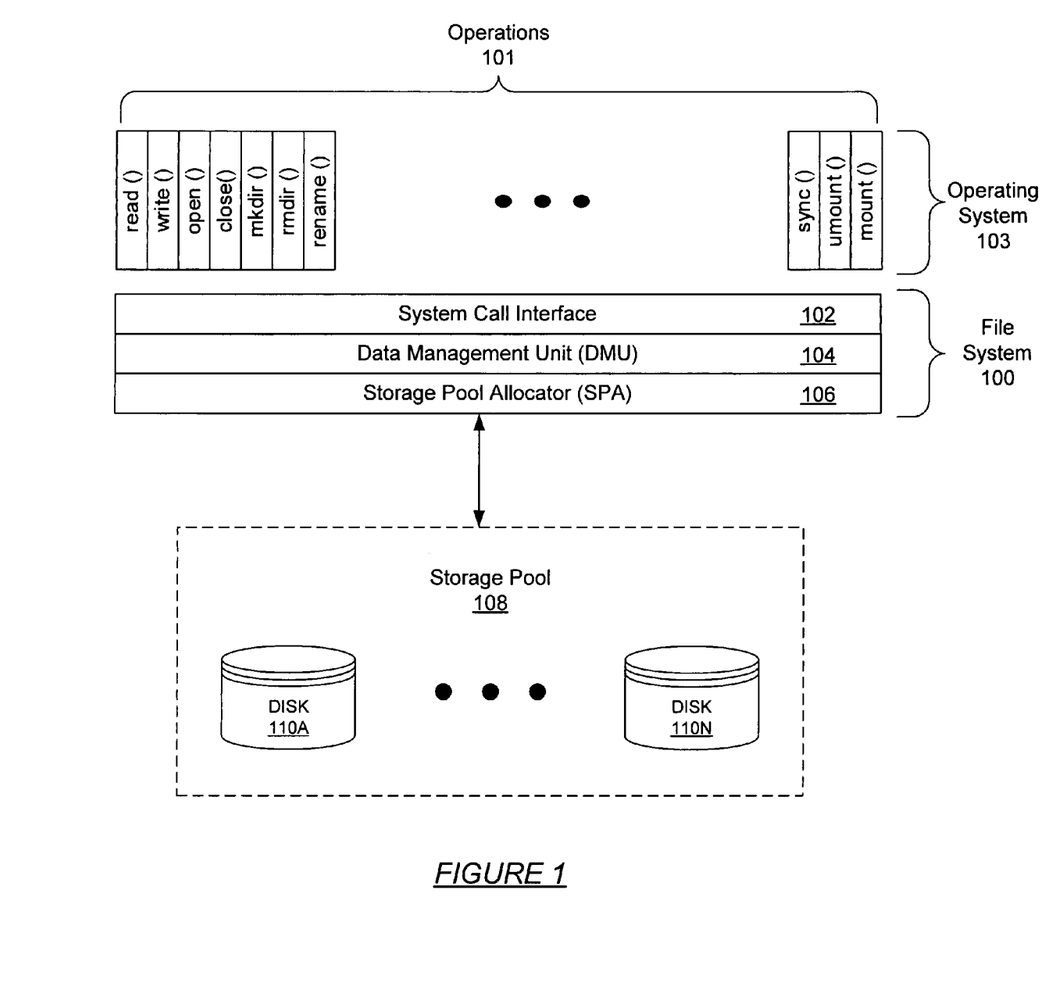
FIG. 1 shows a system architecture in accordance with an embodiment of the invention.

FIG. 1 shows a system architecture in accordance with one embodiment of the invention. The system architecture includes an operating system (103) interacting with a file system (100), which interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks (as described in FIG. 3 below). Additionally, in one embodiment of the invention, the DMU (104) includes functionality to group related work (i.e., modifications to data blocks and indirect blocks) into I/O requests allowing related blocks to be forwarded to the SPA (106) together. The SPA (106) receives transactions from the DMU (106) and subsequently writes the blocks into the storage pool (108). The operation of the SPA (106) is described in FIG. 2 below.

In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
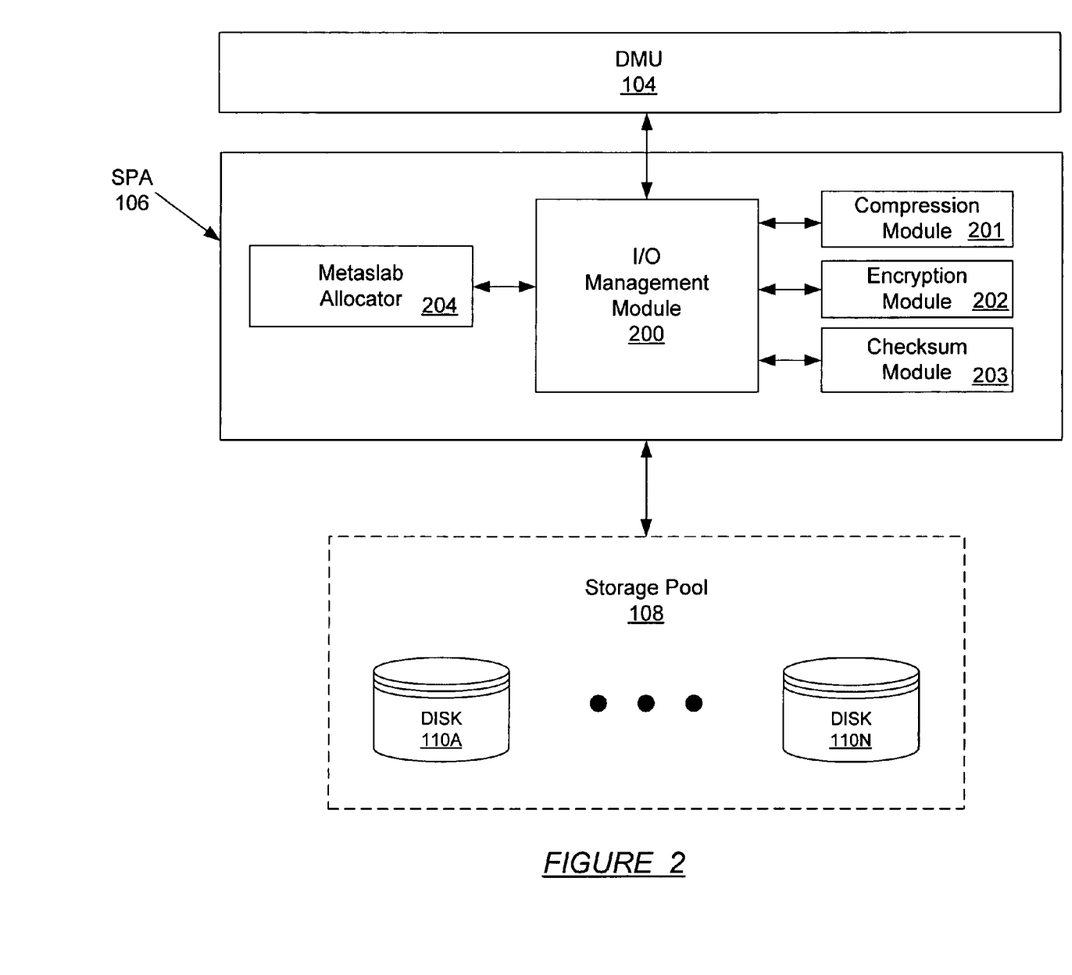
FIG. 2 shows a storage pool allocator in accordance with an embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules is described in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks.

The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator may include a policy that specifies a method to allocate segments.

Figure 3:
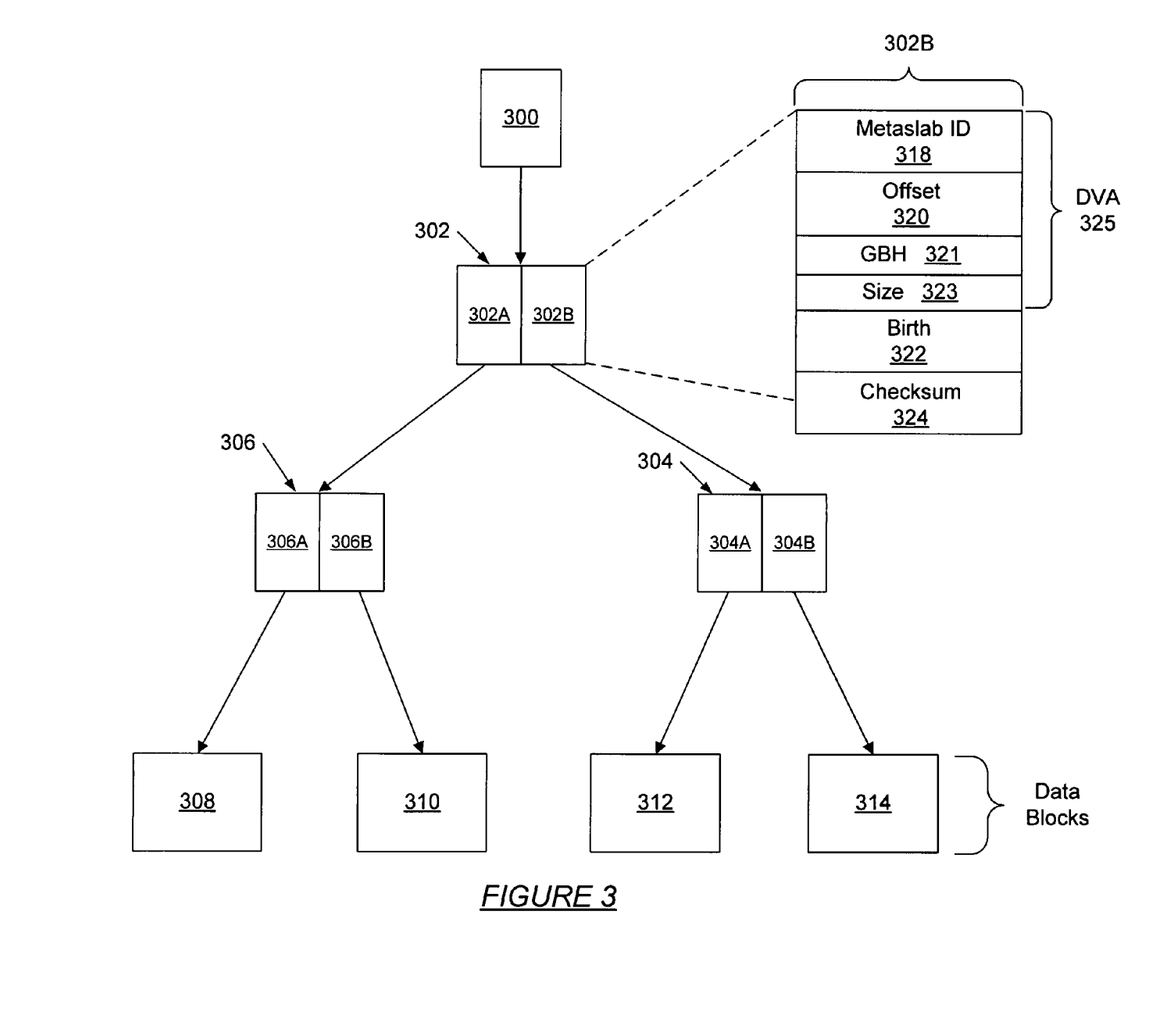
FIG. 3 shows a hierarchical data configuration in accordance with an embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool.

The root block (300) typically points to subsequent indirect blocks (302, 304, and 306). In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather data blocks contain actual data of files within the file system.

In one embodiment of the invention, each block pointer includes a metaslab ID (318), an offset (320) within the metaslab, a gang block header bit (321), a size field (323), a birth value (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. Additionally, in one embodiment of the invention, the metaslab ID (318), offset (320), gang block header bit (321), and size field (323) are collectively referred to as a disk virtual address (DVA) (325). In one embodiment of the invention, the size field (323) represents the total combined size of the blocks referenced by the block pointer.

The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until modified versions of the data block and indirect block have been committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum, size, gang block header) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Using the infrastructure shown in FIGS. 1-3, the following discussion describes a method for allocating blocks to store data using several noncontiguous blocks of various sizes. More specifically, the SPA uses gang blocks to represent a uniform size of allocated block space to the DMU, when in fact the gang block is made up of smaller, noncontiguous blocks of free space that is available on physical disks in the storage pool.

Figure 4:
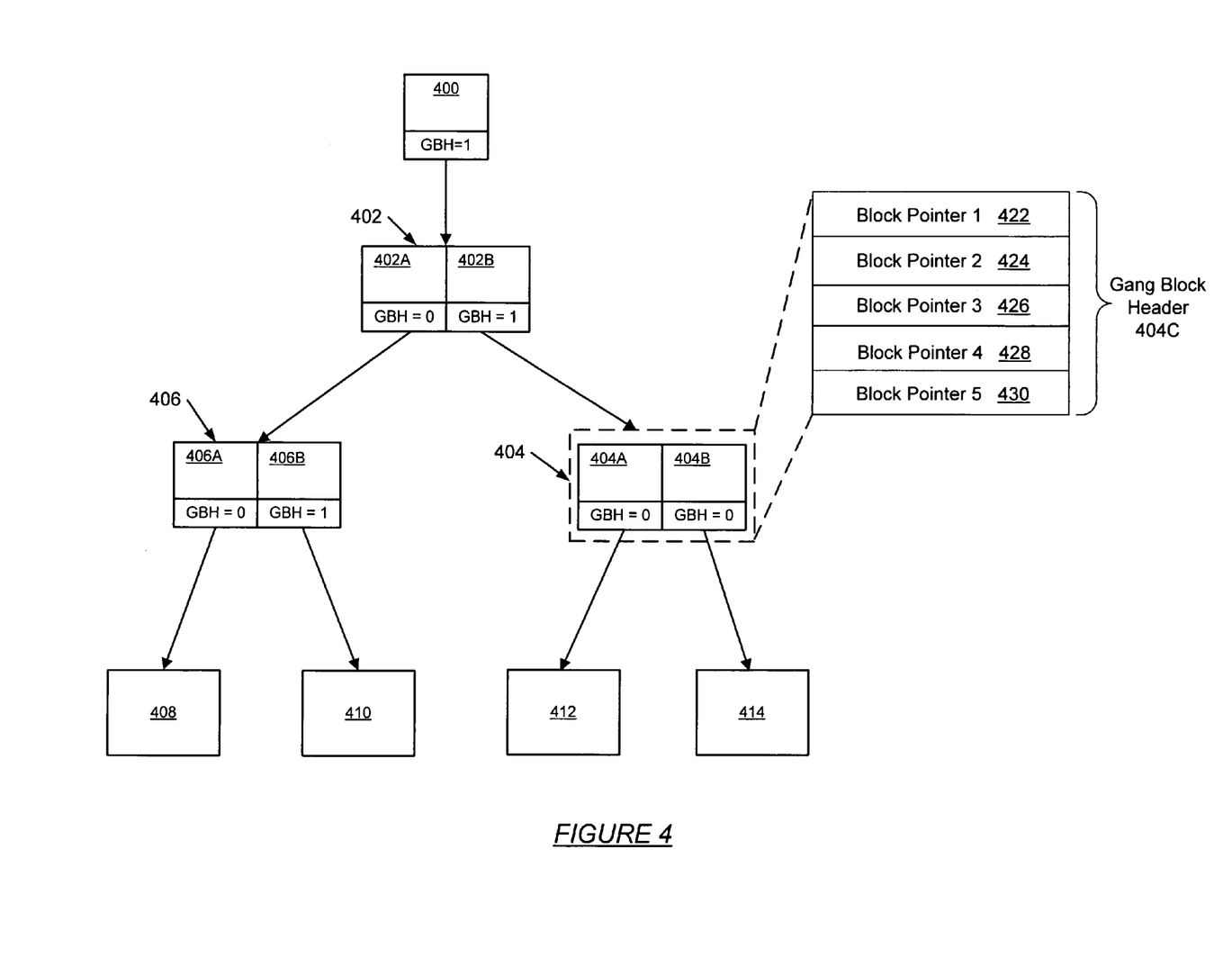
FIG. 4 shows an example in accordance with an embodiment of the invention.

FIG. 4 shows an example of a gang block header in accordance with one embodiment of the invention. More specifically, FIG. 4 shows the hierarchical structure of FIG. 3, where particular blocks within the storage pool are gang block headers. FIG. 4 shows a root block (400), two levels of indirect blocks (i.e., 402, 404, 406), and data blocks (408, 410, 412, 414). In one embodiment of the invention, block pointer (402B) includes a set gang block header (GBH) bit. As noted above, in one embodiment of the invention, the DVA of each block pointer includes a GBH bit and a size field that represents the total size of the block referenced by the DVA. When the gang block header bit is set in a block pointer, this indicates that the block referenced by the block pointer is a gang block header. As shown in FIG. 4, the block referenced by block pointer (402B) is a gang block header (404C).

More specifically, to the DMU, block pointer (402B) points to the entire block (404). However, there is not enough contiguous space to store the block (i.e., 404) such that only one block pointer reference is needed to reference the block. Accordingly, in one embodiment of the invention, block pointer (402B) points to a gang block header (404C) which, in turn, includes a number of block pointers (i.e., 422, 424, 426, 428, 430) that reference non-contiguous blocks. The non-contiguous blocks referenced by the block pointers within the gang block header, when combined, make up the contents of block (404).

In one embodiment of the invention, a gang block header is a block of uniform fields with a fixed size. More specifically, a gang block header is the minimum size allocateable by the SPA (e.g., 512 bytes). In one embodiment of the invention, a gang block header is used to piece together non-uniform, non-contiguous blocks of free space available within the storage pool. For example, when the DMU requests to write a block of a particular size, and the storage pool does not contain a contiguous block on disk of the requested size, a gang block header may be allocated, and subsequently used to store a number of non-contiguous block pointers referencing space in the storage pool that, when combined, correspond to the size of the contiguous block of the size requested by the DMU.

For example, consider the scenario where the DMU requests the SPA to allocate a block of 128 KBytes. However, the physical disks in the storage pool do not contain a single, contiguous block of 128 KBytes. In this case, the SPA may allocate a gang block header with several block pointers that reference smaller, non-contiguous blocks of free space within the storage pool (e.g., four blocks of 32 KBytes). Further, in one embodiment of the invention the blocks referenced by each block pointer in the gang block header may reference a block of equal or a smaller size than the block pointer before it (i.e., in the gang block header). For example, if the first few block pointers in the gang block header reference a block of 32 Kbytes, then the successive block pointers may reference blocks of 32 Kbytes or smaller. Those skilled in the art will appreciate that the blocks referenced by the gang block header are not required to be uniform in size. The block pointers stored in the gang block header each represent one of these smaller, non-contiguous blocks of free space. In one embodiment of the invention, each block pointer in the gang block header contains the checksum, birth, and DVA of the smaller, non-contiguous block referenced by the block pointer. Eventually, a block pointer referencing the gang block header is passed back to the DMU, and the DMU receives only one block pointer that seemingly references 128 KBytes of space.

In FIG. 4, the expanded view of block (404) shows the contents of a gang block header. Again, FIG. 4 shows a hierarchical tree structure including a root block (400), indirect blocks (402, 404, 406), and data blocks (408, 410, 412, 414). Each indirect block (402, 404, 406) includes block pointers (i.e., 402A, 402B, 404A, 404B, 406A, 406B, respectively). As mentioned above, in one embodiment of the invention, the gang block header (404C) includes multiple block pointers (i.e., Block Pointer 1 (422), Block Pointer 2 (424), Block Pointer 3 (426), Block Pointer 4 (428), Block Pointer 5 (430)). Additionally, each block pointer (422, 424, 426, 428, 430) within a gang block header (420) is a block pointer as described above (i.e., each block pointer (422, 424, 426, 428, 430) includes a DVA, birth, and checksum value).

Further, each block pointer in the gang block header references a gang block (i.e., a block of non-uniform, non-contiguous free space) allocated by the SPA. Each block pointer contains the metaslab ID, offset, birth, and checksum of the gang block referenced by the block pointer. In one embodiment of the invention, the block pointer that references the gang block header (e.g., 402B in FIG. 4) contains the checksum of the gang block header itself. In one embodiment of the invention, the block pointer (402B) also includes the total size of block (404), including the total size of all the blocks referenced by the gang block header (404C). In other words, the size field within the DVA of the block pointer (402B) represents the total size represented by piecing together the blocks referenced by the gang block header (404C). One skilled in the art will appreciate that any block (e.g., indirect block, data block) within the storage pool may be a gang block (except a gang block header itself).

In one embodiment of the invention, gang block headers may be nested within another gang block header. For example, referring to FIG. 4, one or more of the block pointers (422, 424, 425, 428, 430) in the gang block header (404B) may be a block pointer that references another gang block header. Consider the scenario where one gang block header (i.e., of the minimum size allocateable by the SPA) does not include enough block pointers to obtain the size of a block requested by the DMU. In this case, gang block headers may be nested in order to continue piecing together non-uniform, non-contiguous blocks of free space until the desired total size requested by the DMU is obtained.

Figure 5:
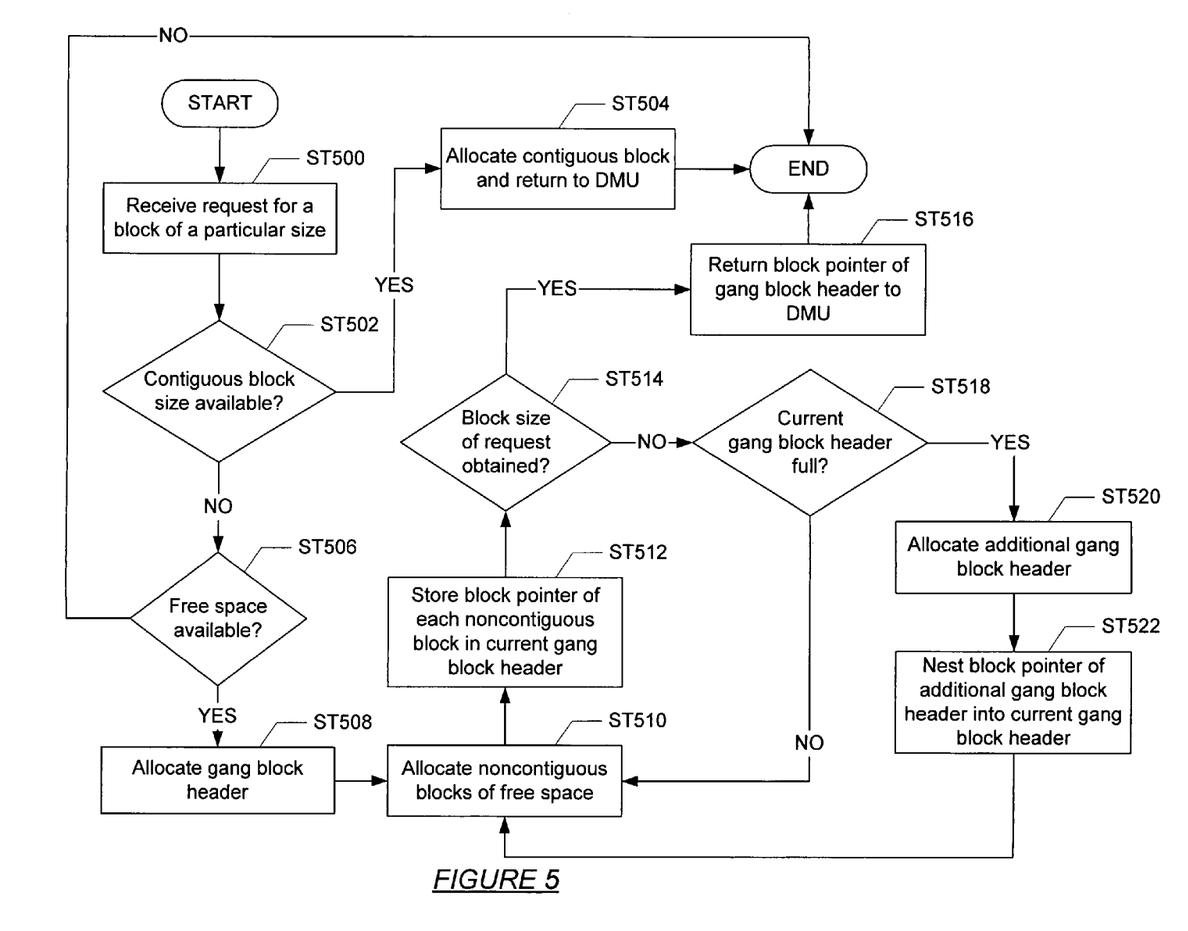
FIG. 5 shows a flow chart for allocating space in accordance with an embodiment of the invention.

FIG. 5 shows a flow chart for allocating space using gang block headers in accordance with one embodiment of the invention. Initially, a request for a particular block size of data is received by the SPA from the DMU (Step 500). In one embodiment of the invention, the DMU requests blocks of a uniform size for a particular level of the tree structure shown in FIG. 3. Subsequently, the SPA determines whether a contiguous block of free space for the size specified by the DMU is available within the storage pool (Step 502). If a contiguous block is available within the storage pool, then the block is allocated by the SPA and the address of the location of the block is returned to the DMU (Step 504). Alternatively, if no contiguous space is available for the size specified by the DMU, then a subsequent determination is made whether sufficient free space exists in the storage pool to satisfy the request (Step 506). If sufficient free space is not available in the storage pool, then the process ends. In one embodiment of the invention, if sufficient free space is available within the storage pool, then a gang block header is allocated by the SPA (Step 508).

As described above, a gang block header is the minimum size allocateable by the SPA (e.g., 512 bytes). Once a gang block header is allocated, the SPA allocates several non-contiguous blocks of free space (Step 510) and subsequently stores a block pointer that references each non-contiguous block in the current gang block header (Step 512). The non-contiguous blocks of free space are allocated until the desired size of the DMU is obtained (Step 514). Once the desired block size is obtained, the block pointer of the gang block header is returned to the DMU (Step 516). Additionally, in one embodiment of the invention, the block pointer of the gang block header that is returned to the DMU includes the gang block header bit set to a value of '1'.

More specifically, the DVA of the block pointer that references the gang block header is a field in memory (i.e., a memory location) that includes several bits (i.e., variables that holds a value of either zero or one), each corresponding to different information. In this case, one of the bits in the DVA is reserved for the gang block header bit. In one embodiment of the invention, setting the gang block header bit involves changing the value of the bit to a '1' so that the gang block header bit is enabled (i.e., indicates that the block referenced is a gang block header). In one embodiment of the invention, from the DMU's perspective, the block pointer returned is the same as any other block pointer that references another block (e.g., an indirect block). Therefore, the fact that the block pointer returned actually references a gang block header is transparent to the DMU. Those skilled in the art will appreciate that if a gang block header is not allocated to satisfy a DMU request, then the gang block header bit in the block pointer includes a value of '0' such that the gang block header bit is not enabled (i.e., the memory location in the DVA of the gang block header bit contains a value of zero).

If the desired size requested by the DMU is not obtained, then a determination is made as to whether the gang block header is full (i.e., no more block pointers can be stored in the current gang block header) (Step 518). If the gang block header is not full, then additional block pointers referencing non-contiguous blocks are stored in the gang block header until the desired size of the block is obtained (i.e., Steps 510-514 are repeated). Alternatively, if the gang block header is full, then another gang block header is allocated (Step 520) and a block pointer referencing the additional gang block header is placed in the current gang block header (i.e., the additional gang block header is nested within the outer gang block header) (Step 522). Subsequently, Steps 510-520 may be repeated for the nested gang block header. When enough space has been allocated to satisfy the request from the DMU, the process ends and the block pointer referencing the outermost gang block header is passed to the DMU in response to the particular block size request.

Figure 6:
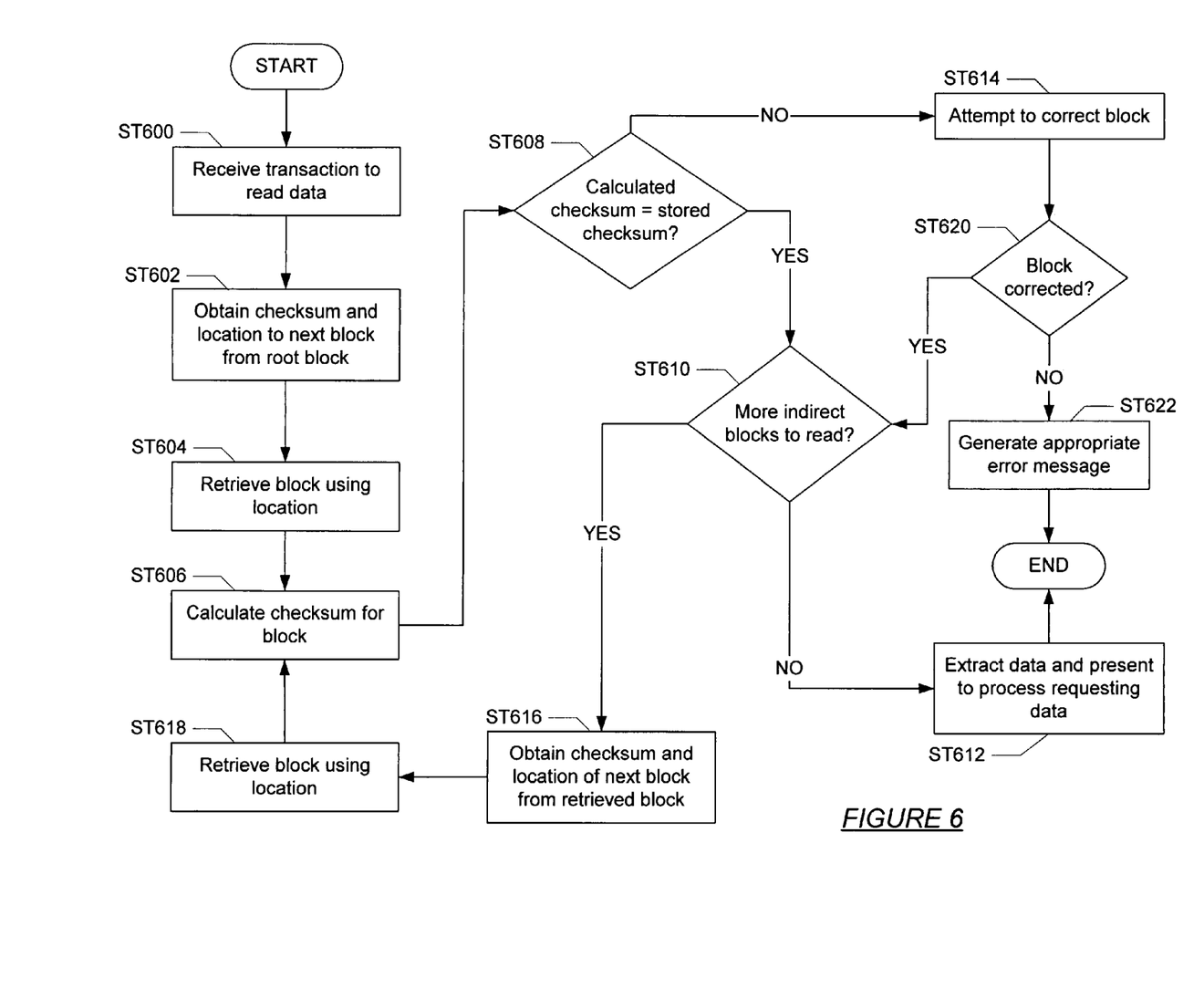
FIG. 6 shows a flow chart for reading blocks in accordance with an embodiment of the invention.

FIG. 6 shows a flow chart detailing a method for reading data in accordance with one embodiment of the invention. Initially, a transaction to read data is received (Step 600). A checksum and a location to the next block (i.e., a data block or an indirect block) stored in the root block are subsequently retrieved (Step 602). Those skilled in the art will appreciate that this may include retrieving a gang block header, a process of which is explained in FIG. 7 below. The location (e.g., the metaslab ID and offset) is subsequently used to obtain the block (i.e., the data block or the indirect block) (Step 604).

The checksum of the retrieved block is then calculated (Step 606). A determination is subsequently made as to whether the stored checksum is equal to the calculated checksum (Step 608).

If the stored checksum is equal to the calculated checksum, then a determination is made as to whether the retrieved block is a data block (Step 610). If the retrieved block is a data block, then the data is extracted from the data block and presented to the process requesting the data (Step 612). Alternatively, if the retrieved block is not the data block, then the location of the next block (stored within a block pointer within the retrieved block) is obtained (Step 616). The block (data block or indirect block) at the location is subsequently obtained (Step 618). Steps 606-614 are subsequently repeated until either data corruption is encountered (i.e., Step 614) or the data block is encountered (i.e., Step 612).

Alternatively, if the stored checksum is not equal to the calculated checksum, then an attempt is made to correct the data or metadata in the block (Step 614). If the attempt to correct the data in the block is successful (Step 620), then a determination is made whether there are more indirect blocks to read (i.e., if the correct block is a data block) (Step 610). If the corrected block is the data block to be read, then the contents of the data block is extracted and presented to the application or process requesting the data (Step 612). Otherwise, steps 606-610 are repeated until the data block is encountered. In contrast, if the attempt to correct the data is not successful (Step 620), an error message is generated notifying the application (or process that requested the particular block) that the data is corrupted or otherwise invalid (Step 622).

As noted above, FIG. 7 shows a flow chart for reading gang blocks in accordance with one embodiment of the invention. More specifically, the process shown in FIG. 7 begins with Step 602 of FIG. 6, where a location to a next block (i.e., a block pointer) is received from the DMU (i.e., a block pointer is obtained from the DMU during a read operation) (Step 700). Once the block pointer is obtained, a determination is made as to whether the gang block header bit in the block pointer is set (Step 702). If the gang block header bit is not set, then the block referenced by the block pointer is not a gang block header and the read operation continues as explained above (i.e., the contents of the block referenced by the block pointer is returned to the DMU (Step 704)).

Figure 7:
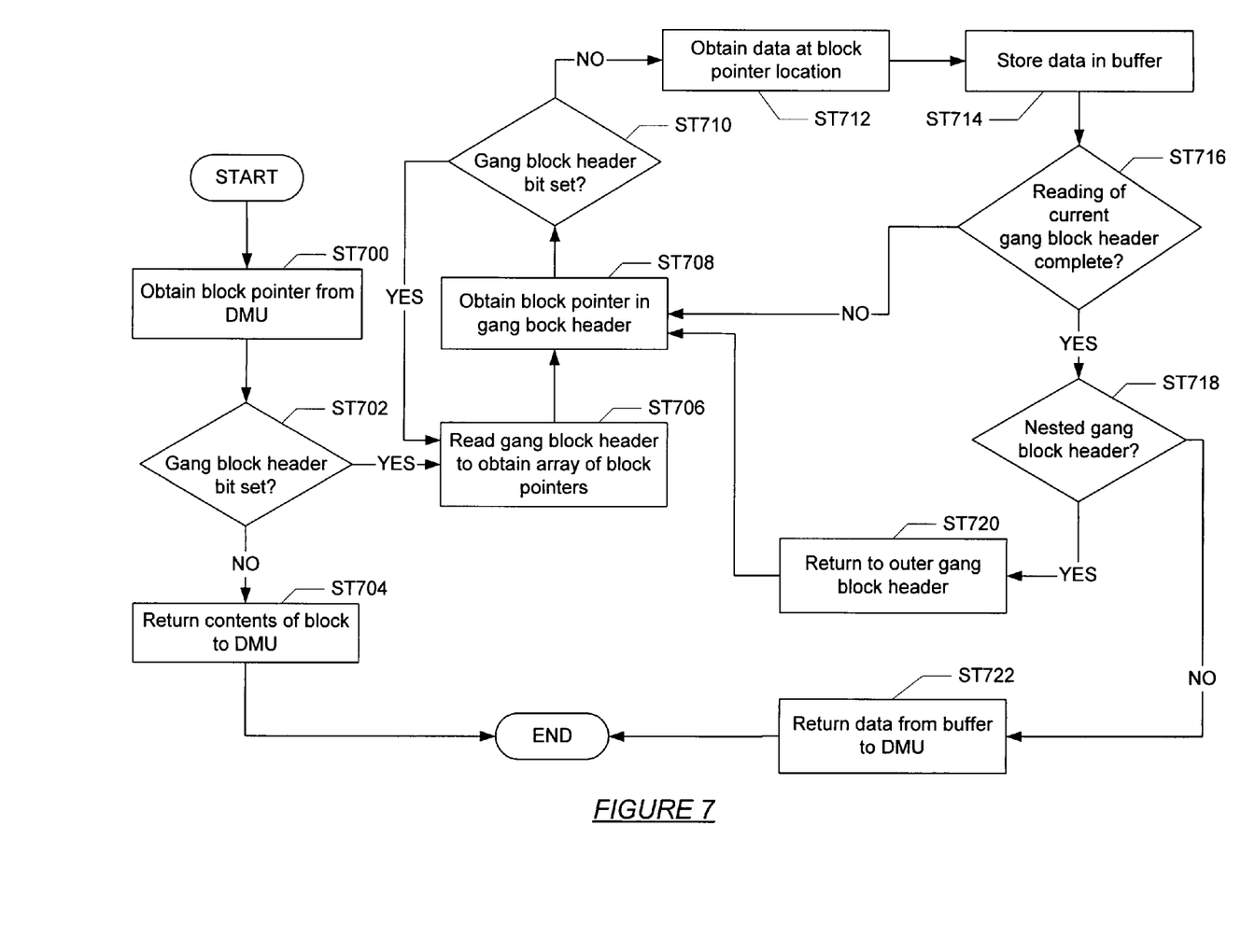
FIG. 7 shows a flow chart for reading gang blocks in accordance with an embodiment of the invention.

Alternatively, if the gang block header bit is set in the block pointer, then the block referenced by the block pointer is a gang block header. At this stage, the gang block header is retrieved and read to obtain an array of block pointers (Step 706). In one embodiment of the invention, the gang block header is obtained using the metaslab ID and offset in the block pointer obtained from the DMU. Subsequently, the first block pointer in the array of block pointers within the gang block header is obtained (Step 708).

At this stage, the block pointer within the gang block header is checked to determine whether the gang block header bit is set (Step 710). As described above, gang block headers may be nested within another gang block header in order to allocate more non-contiguous blocks of free space. If the block pointer within the current gang block header has the gang block header bit set, then the block pointer references another gang block header. In this case, the SPA retrieves the nested gang block header and begins traversing through the block pointers of the nested gang block header and Steps 706-710 are repeated. Otherwise, if the block pointer obtained within the current gang block header does not have the gang block header bit set, then the data referenced by the first block pointer is obtained (Step 712). Subsequently, the data from the location referenced by the first block pointer is stored in a buffer (Step 714). In one embodiment of the invention, the DMU passes the buffer to the SPA when a read transaction is received by the DMU, and the SPA populates the buffer and returns the buffer to the DMU upon completion of the read operation.

Once the data is stored in the buffer, a determination is made as to whether all the block pointers in the current gang block header have been read (Step 716). If additional block pointers remain to be read within the gang block header, then Steps 708-714 are repeated for each block pointer remaining in the gang block header. In contrast, if all the block pointers populated in the gang block header have been read, then a second determination is made as to whether the current gang block header is a nested gang block header (i.e., the current gang block header was obtained from a block pointer referenced in a previous gang block header) (Step 718). If the current gang block header is not a nested gang block header, then the data stored in the buffer is returned to the DMU as one contiguous block of data matching the size of the block the DMU specified (Step 722) and the process ends. One skilled in the art will appreciate that FIG. 7 operates entirely within the SPA; that is, the SPA feeds on itself to process and read from each block pointer within a gang block header (and nested gang block header).

Alternatively, if the gang block header is a nested gang block header, then the SPA returns to read the outer gang block header (Step 720). At this stage, Steps 708-718 are repeated for each nested gang block header. Eventually, when all the block pointers in the outermost gang block header are read, the data stored in the buffer is returned to the DMU as a contiguous block of data (Step 722) and the process ends.

Figure 8:
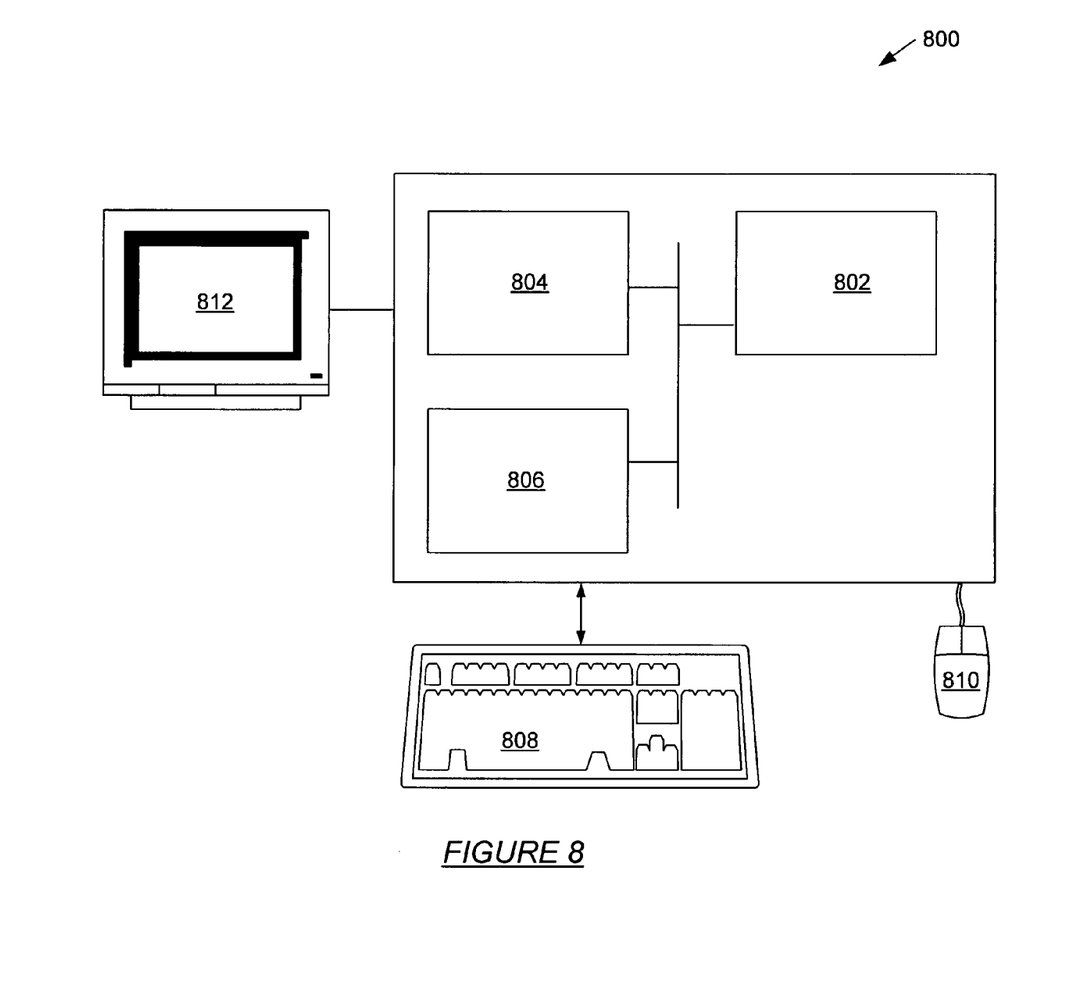
FIG. 8 shows a computer system in accordance with an embodiment of the invention.

One or more embodiments of the invention may be implemented on virtually any type of computer regardless of the platform being used. For example, as shown in FIG. 8, a networked computer system (800) includes a processor (802), associated memory (804), a storage device (806), and numerous other elements and functionalities typical of today's computers (not shown). The networked computer (800) may also include input means, such as a keyboard (808) and a mouse (810), and output means, such as a monitor (512). The networked computer system (800) is connected to a local area network (LAN) or a wide area network via a network interface connection (not shown). Those skilled in the art will appreciate that these input and output means may take other forms. Further, those skilled in the art will appreciate that one or more elements of the aforementioned computer (800) may be located at a remote location and connected to the other elements over a network.

Further, embodiments of the invention may be implemented on a distributed system having a plurality of nodes, where each portion of the invention (e.g., the storage pool, the storage pool allocator, etc.) may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

Embodiments of the invention provide a method to allocate non-contiguous free space on disk so that any free space available on disk is not wasted. Additionally, gang blocks eliminate the need for defragmentation in a file system (i.e., packing stored data close together to create more large contiguous space). Further, embodiments of the invention allow the presentation of several non-contiguous blocks of space as one contiguous block to the DMU. Embodiments of the invention allow the SPA to piece together several gang blocks referenced by a gang block header and present all the pieces to the DMU as a single block of the desired size.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for allocating space on a disk comprising:
receiving a first request to allocate space on the disk having a first size;
allocating, in response to the first request, a first contiguous space having the first size and storing a first indirect block in the first contiguous space;
storing a second indirect block comprising a first block pointer referencing the first indirect block, wherein the first block pointer comprises a first gang block header bit that is not set;
receiving a second request to allocate space on the disk having a second size, wherein no contiguous space of the second size exists on the disk;
allocating, in response to the second request, a gang block header, wherein the gang block header occupies a minimum allocateable portion on the disk;
populating the gang block header; and
responding to the second request to allocate space on the disk by storing a second block pointer in the second indirect block, wherein the second block pointer comprises a second gang block header bit that is set, wherein the second block pointer references the gang block header and comprises a disk virtual address (DVA), a birth, and a checksum field and wherein the DVA comprises the second gang block header bit and a size field, wherein populating the gang block header comprises:
obtaining a second contiguous space on the disk having a third size, wherein the third size is less than the second size,
storing a third pointer to the second contiguous space in the gang block header,
obtaining a third contiguous space on the disk having a fourth size, wherein the fourth size is less than the second size, and
storing a fourth pointer to the third contiguous space in the gang block header.

2. The method of claim 1, further comprising:
if a total size of the second contiguous space and the third contiguous space are less than the second size then:
obtaining a fourth contiguous space on the disk having a fifth size, wherein the fifth size is less than the second size; and
storing a third pointer to the fourth contiguous space in the gang block header.

3. The method of claim 1, wherein the size field stores a value corresponding to the second size.

4. A method for retrieving a block comprising:
receiving a first request to read a first block, wherein the first request comprises a first block pointer, wherein the first block pointer comprises a gang block header bit that is not set;

retrieving, in response to the first request, an indirect block using the first block pointer, wherein the indirect block comprises a second block pointer referencing the first block;

retrieving the first block using the second block pointer;

receiving a second request to read a second block, wherein the second request comprises a third block pointer, wherein the third block pointer comprises a disk virtual address (DVA), a birth, and a checksum field, wherein the DVA comprises the gang block header bit that is set and a size field;

retrieving a gang block header using the third block pointer, wherein the gang block header occupies a minimum allocateable portion on a disk and comprises a plurality of block pointers, and wherein each of the plurality of block pointers references a non-contiguous sub-block of disk space;

processing the gang block header to obtain at least two sub-blocks, wherein the size of each sub-block is less than the size of the second block; and combining the at least two sub-blocks to obtain the second block.

5. The method of claim 4, further comprising:
forwarding the second block to a process that sent the request after the block has been obtained.

6. The method of claim 4, wherein processing the gang blocker header comprises:
retrieving a first sub-block using a first one of the plurality of pointers in the gang block header;
retrieving a second sub-block using a second one of the plurality of pointers in the gang block header.

7. The method of claim 6, further comprising:
storing the first sub-block and the second sub-block in a buffer prior to combining the first sub-block and the second sub-block to obtain the second block.

8. A system, comprising:
a storage pool comprising a first sub-data block, a second sub-data block, a first indirect block, a first data block, a gang block header, and a second indirect block,
wherein the first indirect block comprises a first block pointer referencing the first data block, wherein the first data block is allocated as a contiguous block of space;
wherein the gang block header occupies a minimum allocateable portion in the storage pool,
wherein the gang block header comprises a second block pointer to the first sub-data block and a third block pointer to the second sub-data block,
wherein the first sub-data block and the second sub-data block are located in non-contiguous portions of the storage pool,
wherein a combination of the first-sub data block and the second sub-data block make up a second data block,
wherein the second indirect block comprises a pointer to the gang block header, wherein the pointer comprises a disk virtual address (DVA), a birth, and a checksum field, wherein the DVA comprises a gang block header bit that is set and a size field; and
a storage pool allocator configured to store the second data block using the gang block header and the second indirect block in the storage pool.

9. A computer system for allocating space on a disk comprising:
a processor;
a memory;
a storage device; and
software instructions stored in the memory for enabling the computer system under control of the processor, to:
receive a first request to allocate space on the disk having a first size;
allocate, in response to the first request, a first contiguous space having the first size and storing a first indirect block in the first contiguous space;
store a second indirect block comprising a first block pointer referencing the first indirect block, wherein the first block pointer comprises a first gang block header bit that is not set;
receive a second request to allocate space on the disk having a second size, wherein no contiguous space of the second size exists on the disk;
allocate, in response to the second request, a gang block header, wherein the gang block header occupies a minimum allocateable portion on the disk;
populate the gang block header; and
respond to the second request to allocate space on the disk by storing a second block pointer in the second indirect block, wherein the second block pointer comprises a second gang block header bit that is set, wherein the second block pointer references the gang block header and comprises a disk virtual address (DVA), a birth, and a checksum field and wherein the DVA comprises the second gang block header bit and a size field,
wherein populating the gang block header comprises:
obtaining a second contiguous space on the disk having a third size, wherein the third size is less than the second size,
storing a third pointer to the second contiguous space in the gang block header,
obtaining a third contiguous space on the disk having a fourth size, wherein the fourth size is less than the second size, and
storing a fourth pointer to the third contiguous space in the gang block header.

10. A computer system for retrieving a block comprising:
a processor;
a memory;
a storage device; and
software instructions stored in the memory for enabling the computer system under control of the processor, to:
receive a first request to read a first block, wherein the first request comprises a first block pointer, wherein the first block pointer comprises a gang block header bit that is not set;
retrieve, in response to the first request, an indirect block using the first block pointer, wherein the indirect block comprises a second block pointer referencing the first block;
retrieve the first block using the second block pointer;
receive a second request to read a second block, wherein the second request comprises a third block pointer, wherein the third block pointer comprises a disk virtual address (DVA), a birth, and a checksum field, wherein the DVA comprises the gang block header bit that is set and a size field;
retrieve a gang block header using the third block pointer, wherein the gang block header occupies a minimum allocateable portion on a disk and comprises a plurality of block pointers, and wherein each of the plurality of block pointers references a non-contiguous sub-block of disk space;

process the gang block header to obtain at least two sub-blocks, wherein the size of each sub-block is less than the size of the second block; and combine the at least two sub-blocks to obtain the second block.

11. A computer readable medium for allocating space on a disk comprising software instructions to:

receive a first request to allocate space on the disk having a first size;

allocate, in response to the first request, a first contiguous space having the first size and storing a first indirect block in the first contiguous space;

store a second indirect block comprising a first block pointer referencing the first indirect block, wherein the first block pointer comprises a first gang block header bit that is not set;

receive a second request to allocate space on the disk having a second size, wherein no contiguous space of the second size exists on the disk;

allocate, in response to the second request, a gang block header, wherein the gang block header occupies a minimum allocateable portion on the disk;

populate the gang block header; and respond to the second request to allocate space on the disk by storing a second block pointer in the second indirect block, wherein the second block pointer comprises a second gang block header bit that is set, wherein the second block pointer references the gang block header and comprises a disk virtual address (DVA), a birth, and a checksum field and wherein the DVA comprises the second gang block header bit and a size field, wherein populating the gang block header comprises:
  obtaining a second contiguous space on the disk having a third size, wherein the third size is less than the second size,
  storing a third pointer to the second contiguous space in the gang block header,
  obtaining a third contiguous space on the disk having a fourth size, wherein the fourth size is less than the second size, and
  storing a fourth pointer to the third contiguous space in the gang block header.

12. A computer readable medium for retrieving a block comprising software instructions to:

receive a first request to read a first block, wherein the first request comprises a first block pointer, wherein the first block pointer comprises a gang block header bit that is not set;

retrieve, in response to the first request, an indirect block using the first block pointer, wherein the indirect block comprises a second block pointer referencing the first block;

retrieve the first block using the second block pointer;

receive a second request to read a second block, wherein the second request comprises a third block pointer, wherein the third block pointer comprises a disk virtual address (DVA), a birth, and a checksum field, wherein the DVA comprises the gang block header bit that is set and a size field;

retrieve a gang block header using the third block pointer, wherein the gang block header occupies a minimum allocateable portion on a disk and comprises a plurality of block pointers, and wherein each of the plurality of block pointers references a non-contiguous sub-block of disk space;

process the gang block header to obtain at least two sub-blocks, wherein the size of each sub-block is less than the size of the second block; and combine the at least two sub-blocks to obtain the second block.

13. A network system having a plurality of nodes, comprising:

a storage pool comprising a first sub-data block, a second sub-data block, a first indirect block, a first data block, a gang block header, and a second indirect block,
  wherein the first indirect block comprises a first block pointer referencing the first data block, wherein the first data block is allocated as a contiguous block of space;
  wherein the gang block header occupies a minimum allocateable portion in the storage pool,
  wherein the gang block header comprises a second block pointer to the first sub-data block and a third block pointer to the second sub-data block,
  wherein the first sub-data block and the second sub-data block are located in non-contiguous portions of the storage pool,
  wherein a combination of the first-sub data block and the second sub-data block make up a second data block,
  wherein the second indirect block comprises a pointer to the gang block header, wherein the pointer comprises a disk virtual address (DVA), a birth, and a checksum field, wherein the DVA comprises a gang block header bit that is set and a size field; and a storage pool allocator configured to store the second data block using the gang block header and the second indirect block in the storage pool, wherein the storage pool resides on any one of the plurality of nodes, and wherein the storage pool allocator resides on any one of the plurality of nodes.

* * * * *